Feb. 11, 1958  J. M. GERTY  2,823,326
MICROSYN MOUNTING AND ADJUSTING MECHANISM
Filed Nov. 25, 1955

INVENTOR.
John M. Gerty
BY E. W. Christen
ATTORNEY

United States Patent Office 2,823,326
Patented Feb. 11, 1958

2,823,326

MICROSYN MOUNTING AND ADJUSTING MECHANISM

John M. Gerty, Menomonee Falls, Wis., assignor to General Motors Corporation, Detroit, Mich., a corporation of Delaware Application November 25, 1955, Serial No. 548,812

7 Claims. (Cl. 310—90)

This invention relates to microsyn devices, and more particularly, to means for mounting and providing translational centering and rotational alignment adjustments of a microsyn stator with respect to its rotor.

Such microsyn devices are commonly employed on the output shaft of precision gyroscopes and the like for sensing and converting small movements or displacements of the gyro into precise electrical output signals or for imparting a torque to exert a control influence thereon. In these installations it is necessary that the microsyn stator be precisely centered and aligned with respect to the microsyn rotor which is carried by the output shaft of the gyro. If the component parts of the microsyn are improperly positioned, side or decentering forces and other undesirable effects are encountered which seriously limit the effective operating range of the microsyn and gyro instrument.

The present invention has for an object to provide an adjusting and holding mechanism for a microsyn stator mount which is simple to manufacture and uses a minimum number of parts. Another object is to provide such mechanism which is adapted to provide accurate and precise translational and rotational movements for centering and aligning a microsyn stator with respect to its rotor with a minimum number of adjustments. A related object is to provide such mechanism in which translational centering adjustments are not affected by rotational alignment adjustments.

The above and other objects, together with the features and advantages of the present invention, will appear more fully from the following description and drawings in which.

Figure 1:
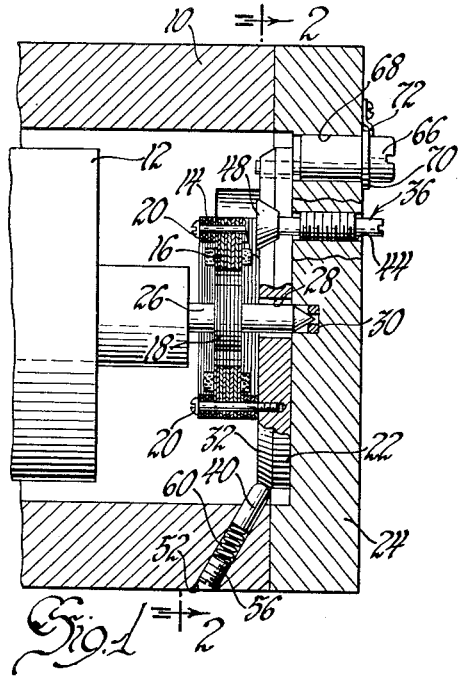
Fig. 1 is a cross-sectional, broken, elevation view of a microsyn installation using an adjustable stator mount positioning and clamping mechanism in accordance with the preferred embodiment of the present invention.

Referring to the drawings, Fig. 1 is a diagrammatic illustration of a gyro installation equipped with a microsyn stator mount and adjusting mechanism in accordance with the present invention, and includes a gyro housing 10 having a gyro float 12 and a microsyn device 14 mounted therein. The microsyn 14 is of conventional design and may be either a signal generator device or a torque generator device having a stator 16 and rotor 18.

The microsyn stator 16 is detachably mounted as by screws 20 on the face of a floating mounting plate 22 adjacent an end wall or cover 24 for the gyro housing. The microsyn rotor 18 may be mounted on or coupled to the gyro float pivot shaft 26 which normally is aligned with the output axis of the instrument. The shaft 26 extends through a central opening 28 in the plate 22 and is suitably supported as by a pivot bearing 30 in the housing end wall or cover, the specific form of support and bearing being unimportant to the present invention.

The stator mounting plate 22 is a flat, circular, floatingly mounted disk having a tapered or chamfered conical surface portion 32 extending around its periphery. The microsyn stator is mounted on the plate so that the circular pole faces of the stator poles thereof are centered with the center of the plate so as to be concentric with the outer conical surface of the plate. The plate is positively positioned and securely held against the housing end wall or cover by the adjusting mechanism of the present invention without need for auxiliary clamping means.

The adjusting mechanism for securing translational centering movement of the plate comprises a pair of adjusting shafts or screws 36, 38 and at least one cooperating spring urged pin or ball 40. The pin is seated in the housing and is shown located on a vertical diameter symmetrically disposed with respect to and equidistant from the adjusting screws. The adjusting screws 36 and 38 are threadedly received in a pair of threaded openings, one of which is shown at 44, extending through the cover of the housing.

The inner end of each screw has an enlarged, generally conically shaped portion as 48, which is in slidable contacting engagement with the tapered face portion 32 of the mounting plate. By reason of their tapered conical faces, which are in contact with the complementary tapered peripheral portion of the mounting plate, the screws will provide a wedging action having a component of force in the plane of mounting plate that serves to position the plate radially and an axial component of force that serves to hold the plate against the cover.

Figure 2:
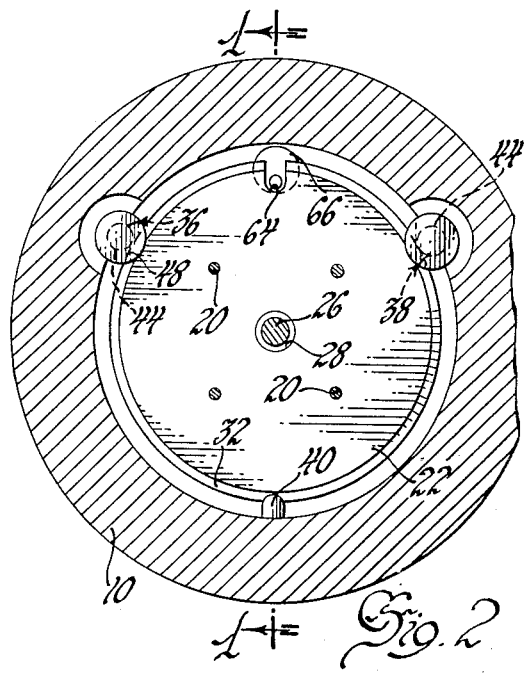
Fig. 2 is a view taken in the direction 2—2 of Fig. 1.

The pin 40 has a spherical nose and is disposed so that its axis or point of contact with the plate lies in a plane equally spaced from or symmetrically disposed with respect to the screws 36 and 38, as shown in Fig. 2. Where only a single holding pin is employed as in the subject embodiment, it should be located so that the resultant component of force supplied by the pin in the plane of the mounting plate will lie between the adjusting screws in order that the pin will hold the plate against the screws. The pin is received within a threaded opening 52 in the housing which receives a threaded set screw 56 therein that cooperates with a spring 60 to urge the pin against the tapered face of the mounting plate. The opening may be inclined as shown in Fig. 1 so that the axis of the pin and opening will be at right angles to the conical surface 32 of the plate, thereby most effectively clamping the mounting plate to the cover of the housing.

Individual rotation of the screws 36 and 38 from the exterior of the housing will enable any desired translational movement to be made to the plate, whereby the microsyn stator may be centered concentrically with the microsyn rotor, while effectively holding the plate and clamping it to the housing cover.

Rotational adjustment of the plate in order that the microsyn may be properly aligned with a vertical or horizontal axial plane of the gyroscope may be obtained, for example, by providing a U-shaped slot 64 in the plate that cooperates with an eccentric pin 66 which is freely received in an opening 68 extending through the housing cover. The pin 66 may be retained in the cover in any suitable manner as by a shoulder 70 provided near its outer end and a spring clip 72 on the cover, substantially as shown.

Due to the concentricity of the plate and stator, rotary movement of the plate by the eccentric pin 66 and slot 64 will not change the centering of the stator and rotor effected by the translational adjusting screws, the conical peripheral portions 32 of the plate 22 sliding on the conical portions of the adjusting screw during such rotary adjustment. Thus, a minimum of three adjustments will be required to obtain any combination of translational and rotary adjustments, a salient feature of the present invention.

Figure 3:
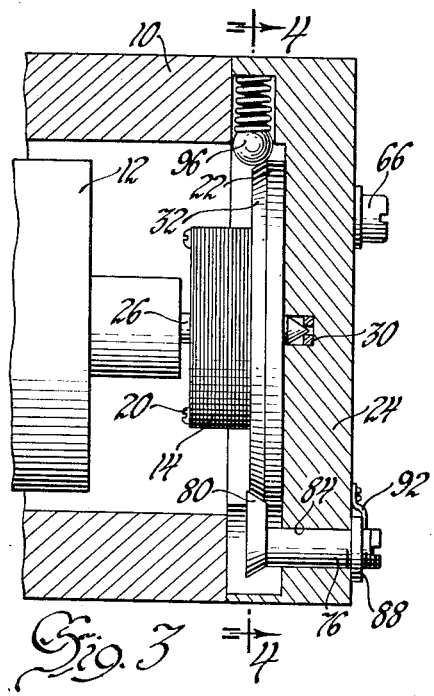
Fig. 3 is a cross-sectional, elevation view of a microsyn stator mount adjusting mechanism in accordance with another embodiment of the present invention.
Figure 4:
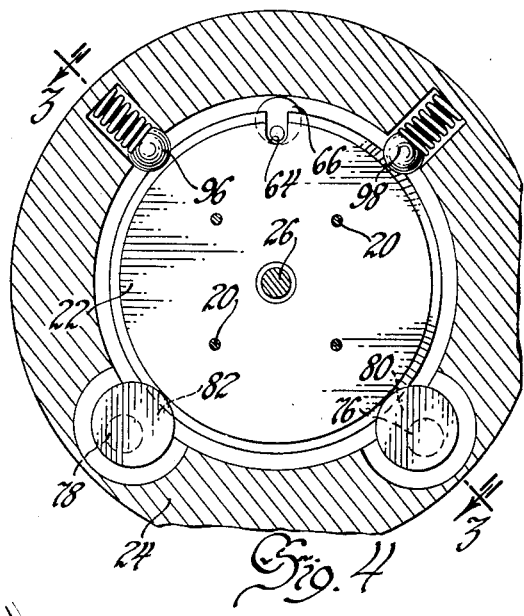
Fig. 4 is a view taken in the direction 4—4 of Fig. 3.

In the embodiment of Figs. 3 and 4, the adjusting screws 36 and 38 of Figs. 1 and 2 are replaced with eccentric shafts 76, 78 each having an eccentric conically shaped portion 80, 82 which is complementary to and engages the conically tapered surface portion 32 of the mounting plate 22. The body of each translational adjusting shaft is unthreaded and passes freely through an unthreaded opening such as 84 in the housing cover. The outer end of each adjustment shaft may be threaded to receive a threaded washer 88 at the end thereof, and cooperating spring clip 92 so as to prevent axial movement thereof. The translational adjusting shafts 76, 78 are shown located on diameters spaced 90 degrees apart with a pair of cooperating spring loaded pins or balls 96, 98 located diametrically opposite the respective shafts.

As in the embodiment of Figs. 1 and 2, rotational adjustment of the plate 22 may be obtained by means of the plate slot 64 and eccentric pin 66, as shown.

What is claimed is:

1. Means for mounting and positively concentrically positioning the stator of an electromagnetic device with respect to its rotor comprising a housing having an end wall, a circular mounting plate adapted to have said stator mounted on a face thereof and having a conical tapered portion extending about its periphery, a pair of angularly spaced adjustment shafts adapted to effect translational adjusting movement of said mounting plate, each of said shafts extending through said housing end wall and having a complementary conical end portion contacting said conical portion of said mounting plate, and a spring urged element seated in said housing and contacting said conical portion of said plate and holding the plate against said conical portions of said adjustment shafts.

2. The combination in accordance with claim 1 above including means for rotatably adjusting said mounting plate without affecting the translational centering thereof accomplished by said adjustment shafts, said means including an eccentric pin extending through the end wall of said housing and received in a U-shaped slot provided in said mounting plate.

3. Means for mounting and positively concentrically positioning the stator of a microsyn device with respect to its rotor comprising a housing having an end wall, a circular mounting plate adapted to have said microsyn stator mounted on a face thereof and having a conical tapered portion extending about its periphery, a pair of angularly spaced adjustment shafts adapted to effect translational adjusting movement of said mounting plate, each of said shafts extending through said housing end wall and having a complementary conical end portion contacting the conical portion of said plate, and a spring urged pin seated in said housing and contacting said conical portion of said plate at a point equidistant from said adjustment shafts.

4. The combination in accordance with claim 3 above including means for rotatably adjusting said mounting plate without affecting the translational centering thereof accomplished by said adjustment shafts, said means including an eccentric pin extending through the end wall of said housing and received in a U-shaped slot provided in said mounting plate.

5. The combination in accordance with claim 3 above wherein said adjustment shafts are threadably received in said housing for locking said mounting plate against the end wall thereof.

6. Means for mounting and positively concentrically positioning the stator of a microsyn device with respect to its rotor comprising a housing having an end wall, a circular mounting plate adapted to have said microsyn stator mounted on a face thereof and having a conical tapered portion extending about its periphery, a pair of angularly spaced adjustment shafts extending through said housing end wall and adapted to effect translational adjusting movement of said mounting plate, each of said shafts having an eccentric end portion of conically tapered shape complementary to and contacting the conical portion of said plate, and a pair of spring urged elements diametrically opposite said adjustment shafts and contacting the conical portion of said plate urging the latter against said eccentric portions of said shafts.

7. The combination in accordance with claim 6 above including means for rotatably adjusting said mounting plate without affecting the translational centering thereof accomplished by said adjustment shafts, said means including an eccentric pin extending through the end wall of said housing and received in a U-shaped slot provided in said mounting plate.

References Cited in the file of this patent

UNITED STATES PATENTS

| | | |
|---|---|---|
| 1,294,697 | Page | Feb. 18, 1919 |
| 2,537,844 | Meredith | Jan. 9, 1951 |
| 2,635,469 | Summers | Apr. 21, 1953 |
| 2,714,311 | Dobson et al. | Aug. 2, 1955 |